United States Patent
Previdi et al.

(10) Patent No.: US 7,499,445 B2
(45) Date of Patent: Mar. 3, 2009

(54) SYSTEM AND METHOD FOR ROUTING ISIS TRAFFIC THROUGH UNIDIRECTIONAL LINKS OF A COMPUTER NETWORK

(75) Inventors: Stefano B. Previdi, Rome (IT); David D. Ward, Somerset, WI (US); Jonathan C. Barth, Collegeville, PA (US); John A. Harper, Mountain View, CA (US); Ian Michael Charles Shand, Surrey (GB)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 11/084,387

(22) Filed: Mar. 18, 2005

(65) Prior Publication Data

US 2006/0209719 A1  Sep. 21, 2006

(51) Int. Cl.
*H04L 12/28* (2006.01)
(52) U.S. Cl. .................. 370/351; 370/401; 709/218; 709/238
(58) Field of Classification Search .............. 370/236, 370/392, 401, 451; 709/238
See application file for complete search history.

(56) References Cited

U.S. PATENT DOCUMENTS

| | | | |
|---|---|---|---|
| 5,519,704 A | 5/1996 | Farinacci et al. | |
| 6,182,147 B1 * | 1/2001 | Farinacci | 709/238 |
| 6,240,464 B1 | 5/2001 | Fijolek et al. | |
| 6,553,423 B1 | 4/2003 | Chen | |
| 6,765,877 B1 | 7/2004 | Foschiano et al. | |
| 6,820,134 B1 | 11/2004 | Zinin et al. | |
| 6,990,075 B2 * | 1/2006 | Krishnamurthy et al. | 370/236 |
| 2001/0051865 A1 | 12/2001 | Kerr et al. | |
| 2003/0048786 A1 * | 3/2003 | D'Annunzio | 370/392 |
| 2004/0218540 A1 | 11/2004 | Foschiano et al. | |
| 2005/0010681 A1 | 1/2005 | Katukam et al. | |
| 2005/0025166 A1 * | 2/2005 | Fujii et al. | 370/401 |

OTHER PUBLICATIONS

Hanks, S., et al., RFC 1701, entitled Generic Routing Encapsulation (GRE), Oct. 1994, pp. 1-8.
Farinacci, D., et al., RFC 2784, entitled Generic Routing Encapsulation (GRE), Mar. 2000, pp. 1-9.
Dommety, G., RFC 2890, entitled Key and Sequence Number Extensions to GRE, Sep. 2000, pp. 1-7.
Draft of ISO/IEC 10589: Second Edition, ISO/IEC 10589: 19XX (Draft), pp. 1-130.
Callon, R., RFC 1195, entitled Use of OSI ISIS for routing in TCP/IP and Dual Environments, Dec. 1990, pp. 1-80.
Smit, H., RFC 3784, entitled Intermediate-System-to-Intermediate-System (IS-IS) Extensions for Traffic Engineering (TE), Jun. 2004, pp. 1-13.
Mirtorabi, S. et al, Network Working Group draft entitled Support of Unidirectional Links in OSPFv2 (draft-mirtorabi-ospf-ud-link-00.txt), Jul. 2005, pp. 1-8.
PCT Notification of Transmittal of the International Search Report and the Written Opinion fot he International Searching Authority, or the Declaration, mailed Aug. 8, 2007, International Application No. PCT/US06/09071, International Filing Date: Mar. 14, 2006, 4 pages.

* cited by examiner

*Primary Examiner*—Chi H Pham
*Assistant Examiner*—Albert T Chou
(74) *Attorney, Agent, or Firm*—Cesari and McKenna LLP

(57) ABSTRACT

A system and method routes data traffic over a unidirectional link of a computer network configured to implement a routing protocol, such as the ISIS routing protocol. To that end, the invention extends the ISIS routing protocol to allow dynamic discovery of neighboring routers (i.e., neighbors) that are connected via the unidirectional link and subsequent establishment of an adjacency between the neighbors over the link. Adjacency establishment is illustratively effected through the use of novel type/length/value (TLV) encoded formats appended to ISIS Hello packets to convey information between the neighbors.

15 Claims, 6 Drawing Sheets

SYSTEM AND METHOD FOR ROUTING ISIS TRAFFIC THROUGH UNIDIRECTIONAL LINKS OF A COMPUTER NETWORK

FIELD OF THE INVENTION

This invention relates generally to computer networks, and, more specifically, to routing traffic over unidirectional links of a computer network.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). A LAN provides relatively short distance communication among the interconnected nodes, whereas a WAN enables long distance communication over links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, such as a router, to extend the effective "size" of each network. Since management of interconnect computer networks can prove burdensome, smaller groups of computer networks may be maintained as routing domains. In this context, a routing domain is broadly construed as a collection of interconnected nodes within a common address space (e.g., a level, area or autonomous system). The networks within a routing domain are typically coupled together by intradomain routers. These routers manage communication among networks within their domains and communicate with each other using an intradomain routing protocol (or interior gateway protocol, IGP). An IGP protocol, such as a conventional link-state protocol, defines the manner with which routing information and network-topology information are exchanged and processed in a routing domain.

An example of a conventional link-state protocol is the Intermediate-System-to-Intermediate-System (ISIS) protocol. The ISIS routing protocol is one of many routing protocols developed by the International Organization for Standardization (ISO) for use in the Open System Interconnection (OSI) protocol suite, as described in *Draft of ISO/IEC 10589: Second Edition*, November 2002, which is incorporated herein by reference in its entirety. The ISIS protocol was originally developed to route in ISO Connectionless Network Protocol (CLNP) networks. A version, typically referred to as Integrated ISIS, has since been created that supports both CLNP and Internet Protocol (IP) networks. The ISIS routing protocol is described in detail in Request for Comments (RFC) 1195, entitled *Use of OSI IS-IS for Routing in TCP/IP and Dual Environments*, December 1990, which is incorporated herein by reference in its entirety.

Typically, a routing protocol, such as ISIS, requires that every link over which it operates is bidirectional in order to, e.g., establish adjacencies over the links. As used herein, an adjacency is a relationship formed between selected neighboring routers (or "neighbors") for the purpose of exchanging routing information and abstracting the network topology. The neighbors are routers that have interfaces to a common communication link of the network, wherein an interface is a connection between a router and the link. Adjacencies are generally established and maintained through the use of a conventional Hello protocol. That is, two routers become neighbors when they see each other's Hello packets over the common link. Moreover, the Hello protocol ensures that communication between neighbors is bidirectional by periodically sending Hello packets over the interfaces. Thus, establishment and maintenance of adjacencies using routing protocols typically require bidirectional communication, i.e., the routers expect to send and receive traffic through the same interface.

Unidirectional links are often deployed in service provider networks that are configured to implement IGP routing protocols, such as ISIS. An example of such a unidirectional link deployment involves satellite broadcast that enables transmission of information to a plurality of "downstream" nodes. In a typical satellite broadcast, a transmitter (e.g., a satellite) is configured to transmit information in one direction to many receivers (e.g., the downstream nodes). Applications of a satellite broadcast include television, such as on-demand video streams, and radio broadcasts. However, unidirectional links allow traffic to be sent in one direction only and therefore there is no way for the routing protocol to establish adjacencies over the links. As a result, solutions are provided to make the unidirectional links "appear" bidirectional.

One solution that takes into account the use of routing protocols over unidirectional links is called Unidirectional Link Routing (UDLR), which consists of creating (for each unidirectional link) a tunnel. Broadly stated, a tunnel is a logical path through which encapsulated packets travel from a source endpoint through a network to a destination endpoint. Encapsulation is typically performed at the source endpoint of the tunnel and de-encapsulation is performed at the destination endpoint. Here, encapsulation may involve enclosing a particular packet (payload) in an additional header to form an encapsulated packet. The additional header provides routing information that enables the encapsulated packet to traverse the network.

A protocol that may be used in a tunneling implementation, such as UDLR, to encapsulate packets is the "Generic Routing Encapsulation" (GRE) protocol defined in RFC 1701, RFC 2784 and RFC 2890, each of which is available from the Internet Engineering Task Force, Network Working Group, http://www.ietf.org. The GRE protocol is typically executed by routers that form the source and destination endpoints of a GRE tunnel. According to the UDLR solution, the GRE tunnel serves as a "back channel" of a unidirectional high-capacity link and transparently emulates a single bidirectional link for unicast transmissions over the unidirectional link. UDLR intercepts packets that need to be sent on receive-only interfaces coupled to the links and sends them on the UDLR back-channel tunnels. When routers receive these packets over UDLR back-channel tunnels, UDLR makes the packets appear as if they were received on send-only interfaces.

However, one problem with the UDLR solution is scalability. Since the UDLR solution employs a unidirectional link to transmit information from a transmitting router to a receiving router in one direction and, in the opposite direction, the two routers use a GRE tunnel, a plurality of GRE tunnel interfaces, one for each unidirectional link, must be configured. That is, for every unidirectional link, a separate GRE tunnel (functioning as a back channel) is needed. This solution is undesirable because it requires associating each interface with an implementation cost that includes one or more data structures and associated processing resources. As such, the solution does not scale properly and the present invention is directed to improving scalability of a network configured to implement an IGP routing protocol over unidirectional links.

SUMMARY OF THE INVENTION

The present invention is directed to a system and method for routing traffic over a unidirectional link of a computer network that is configured to implement a routing protocol, such as the ISIS routing protocol. To that end, the invention extends the ISIS routing protocol to allow dynamic discovery of neighboring routers (i.e., neighbors) that are connected via the unidirectional link and subsequent establishment of an adjacency between the neighbors over the link. Dynamic discovery of the neighbors is illustratively effected through the use of novel type/length/value (TLV) encoded formats appended to ISIS Hello packets to convey information between the neighbors.

In addition, the present invention extends the ISIS routing protocol to allow computation of routes across the network taking into account that one or more links are "true" unidirectional links. This, in turn, enables the ISIS routing protocol to route traffic through the unidirectional link instead of requiring the appearance of "emulated" bidirectional links through the use of back-channel tunnels, as in previous solutions. By obviating the appearance of such bidirectional links (and the associated use of back-channel tunnels), the scalability of the network is advantageously improved.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
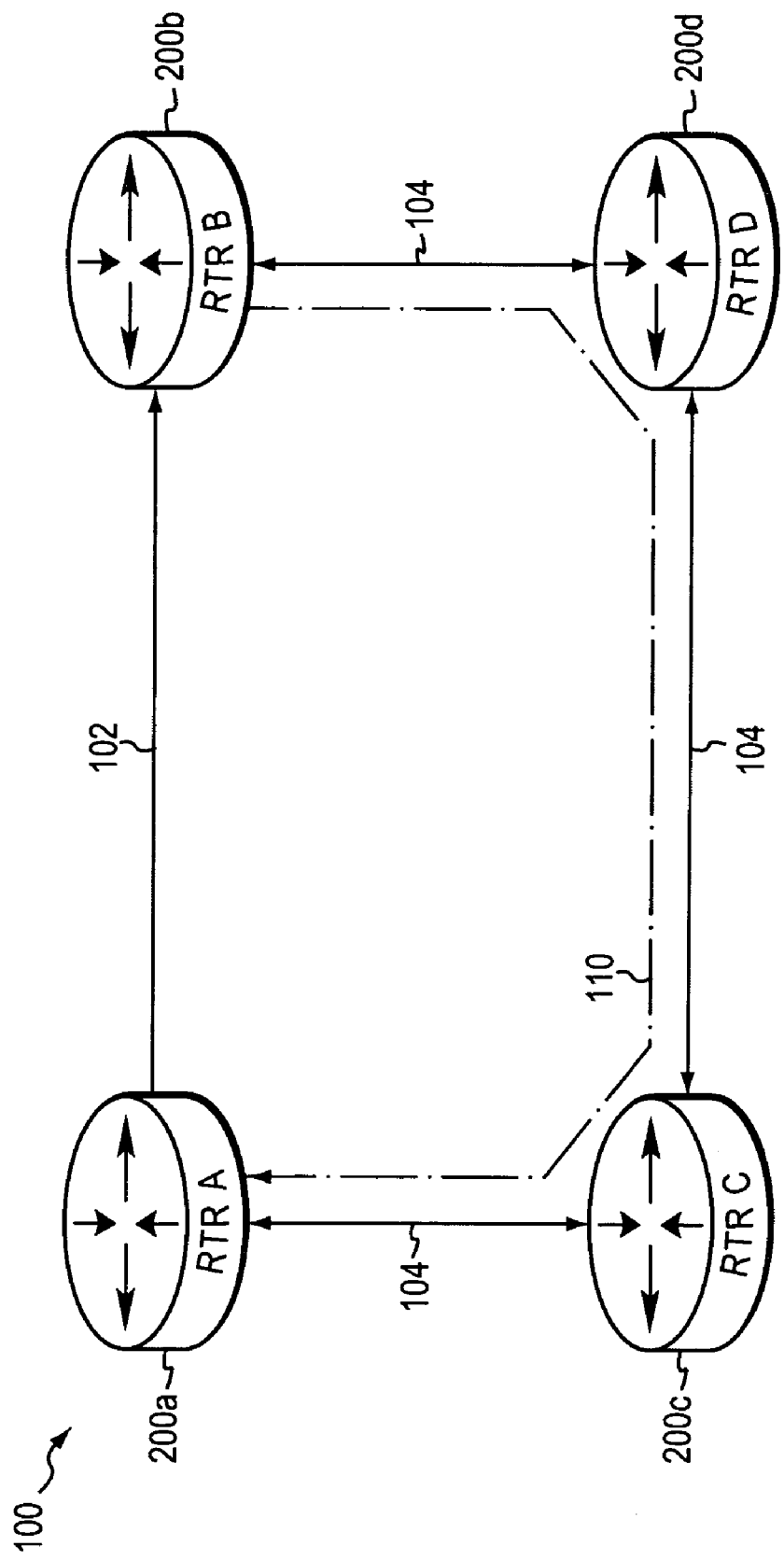
FIG. 1 is a schematic block diagram of a computer network comprising a plurality of intermediate network nodes, such as routers, interconnected within a routing domain.

FIG. 1 is a schematic block diagram of a computer network 100, such as a service provider network, comprising a plurality of intermediate network nodes interconnected within a routing domain. The intermediate network nodes may comprise switches but, in the illustrative embodiment, are preferably routers 200. The routers are illustratively interconnected by point-to-point communication links, such as unidirectional link 102 and bidirectional links 104. Communication among the routers 200 is typically effected by exchanging discrete protocol data units or packets in accordance with predefined protocols, such as the Connectionless Network Protocol (CLNP) and/or the Transmission Control Protocol/Internet Protocol (TCP/IP). Routing decisions within the routing domain may further rely on a predetermined "interior" gateway routing protocol (IGP). An example of an IGP is a conventional link-state protocol, such as the Intermediate-System-to-Intermediate-System (ISIS) protocol. It will be understood to those skilled in the art that other protocols may be advantageously used with the present invention.

Figure 2:
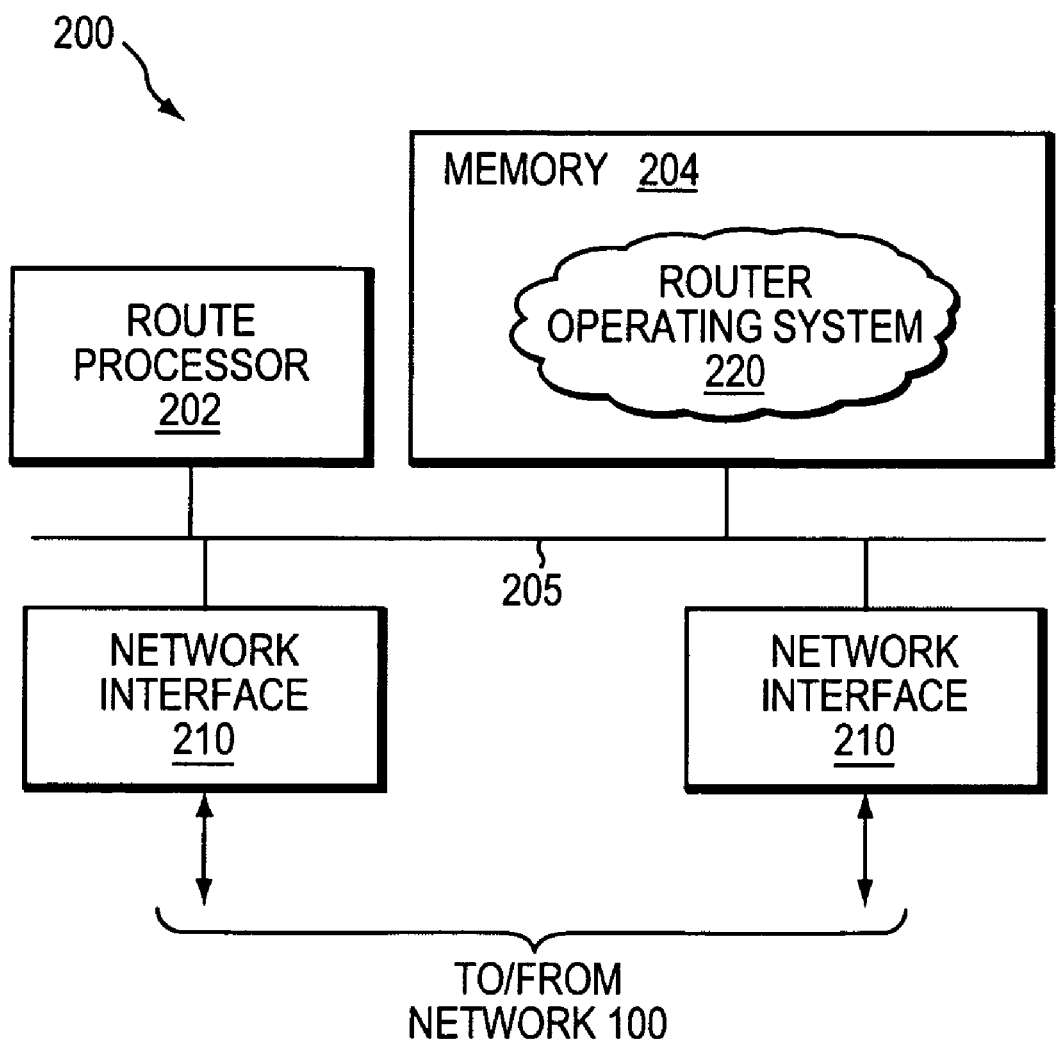
FIG. 2 is a schematic block diagram of a router that may be advantageously used with the present invention.

FIG. 2 is a schematic block diagram of a router 200 that may be advantageously used in accordance with the present invention. The router 200 comprises a route processor 202 coupled to a memory 204 and a plurality of network interface adapters 210 via a bus 205. The memory 204 may comprise storage locations addressable by the processor and interface adapters for storing software programs and data structures that may be advantageously used with the inventive technique described herein. The route processor 202 may comprise processing elements or logic for executing the software programs and manipulating the data structures. It will be apparent to those skilled in the art that other processor and memory means, including various computer readable media, may be used for storing and executing program instructions pertaining to the inventive technique described herein.

A router operating system 220, portions of which is typically resident in memory 204 and executed by the route processor 202, functionally organizes the router by, inter alia, invoking network operations in support of software processes executing on the router. In one embodiment of the invention, the operating system 220 may be implemented as a single process with a large memory address space, wherein pieces of code within that process provide operating system services, such as one or more routing protocols. Yet, in the illustrative embodiment, the operating system services may be implemented as separately-scheduled processes in distinct, protected address spaces. These software processes or modules, each with its own process address space, execute on the router to manage resources internal to the router and, in the case of the ISIS routing protocol, to interact with users.

Figure 3:
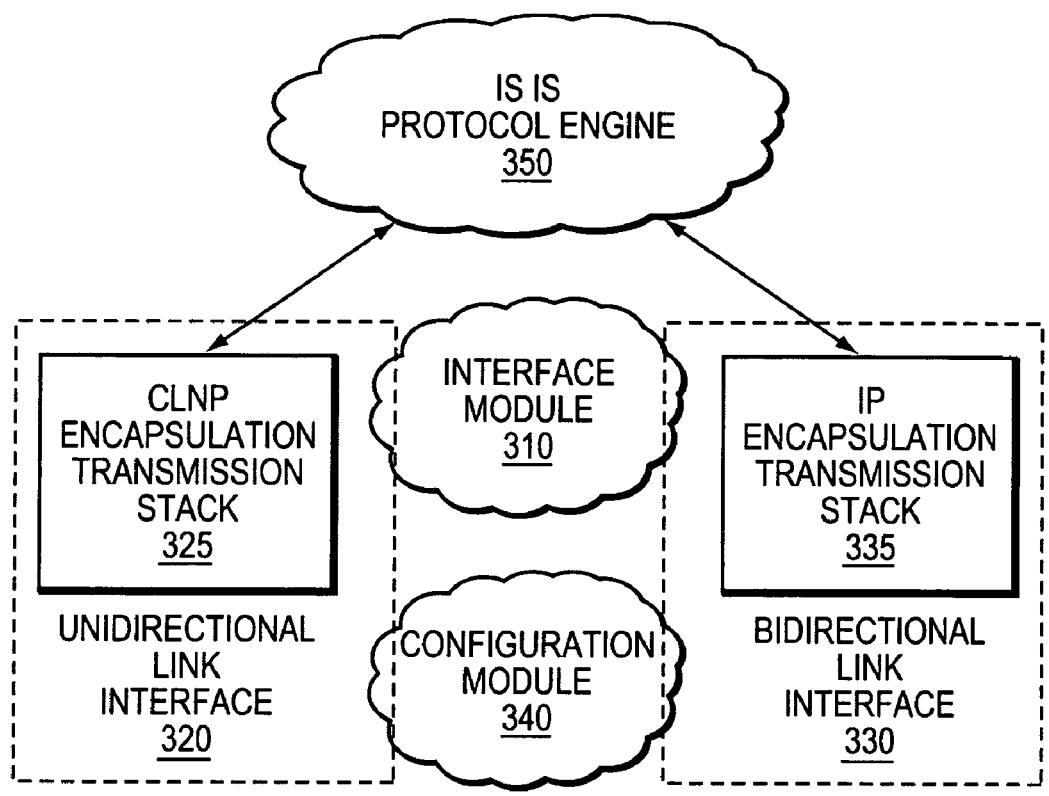
FIG. 3 is a schematic block diagram illustrating interaction between various modules of the router in accordance with the present invention.

FIG. 3 is a schematic block diagram illustrating the interaction between various modules of the router in accordance with the present invention. In the illustrative embodiment, the router modules are embodied as processes, although it will be understood to those skilled in the art that the modules may be implemented as hardware, software, firmware, or any combination thereof. An interface module 310 is adapted to control an interface, such as unidirectional link interface 320 or a bidirectional link interface 330, in the router 200. The interface module 310 interacts with a routing protocol module, e.g., the ISIS protocol engine 350, to inform the protocol engine as to the type of interface it controls (e.g., unidirectional link interface 320) and as to which side (e.g., receive-only side or send-only side) of that interface the router is connected. A configuration module 340 is adapted to configure the ISIS protocol on the interfaces 320 and 330.

In addition, the ISIS protocol engine 350 illustratively interacts with two conventional transmission stacks: a CLNP encapsulation transmission stack 325 configured to encapsulate/de-encapsulate CLNP-encapsulated packets transmitted/received over the unidirectional link interface 320 and an IP encapsulation transmission stack 335 configured to encapsulate/de-encapsulate IP-encapsulated packets transmitted/received over the bidirectional link interface 330. Broadly stated, the transmission stacks 325 and 335 comprise a plurality of layers that interact to format data for transfer over the links of network 100. Predetermined services are performed on the data as it passes through the layers and the layers communicate with each other by means of the predefined protocols.

The present invention is directed to a system and method for routing traffic over a unidirectional link of a computer network that is configured to implement a routing protocol, such as the ISIS routing protocol. To that end, the invention extends the ISIS routing protocol to allow dynamic discovery of neighboring routers (i.e., neighbors) that are connected via the unidirectional link and subsequent establishment of an adjacency between the neighbors over the link. Dynamic discovery of the neighbors is illustratively effected through the use of novel type/length/value (TLV) encoded formats appended to ISIS Hello packets to convey information between the neighbors.

In addition, the present invention extends the ISIS routing protocol to allow computation of routes across the network taking into account that some links are "true" unidirectional links. This, in turn, enables the ISIS routing protocol to route traffic through the unidirectional links instead of requiring the appearance of "emulated" bidirectional links through the use of back-channel tunnels, as in previous solutions. By obviating the appearance of such bidirectional links (and the associated use of back-channel tunnels), the scalability of the network is advantageously improved.

Adjacency Over Unidirectional Link

As noted, the ISIS routing protocol generally requires that every link over which it operates is bidirectional in order to, e.g., establish adjacencies over the links. An adjacency is a relationship formed between selected neighboring routers (or "neighbors") for the purpose of exchanging routing information and abstracting the network topology.

The adjacency is generally established and maintained through the use of a conventional Hello protocol that, in the case of ISIS, ensures communication between the neighbors is bidirectional by periodically exchanging conventional ISIS Hello packets, described in the above incorporated *Draft of ISO/IEC* 10589: *Second Edition*.

The ISIS Hello packets may also be used by a router to dynamically discover neighbors coupled to its attached links. Typically, the ISIS routing protocol is configured to exchange Hello packets between directly connected routers, e.g., routers that are connected via a bidirectional link. As noted, the present invention extends the ISIS routing protocol to allow dynamic discovery of neighbors that are connected via a unidirectional link using, e.g., multi-hop Hello packets. That is, the present invention generally allows a router to send multi-hop Hello packets to a discovered neighbor to which it is not directly connected. To that end, the ISIS Hello packets traverse an alternate, multi-hop path to the neighbor (rather than through a directly-connected unidirectional link).

Assume router 200*a* is connected to unidirectional link 102 as send-only router, e.g., Rtr A, and wishes to establish an adjacency with receive-only router 200*b*, e.g., Rtr B, over unidirectional link 102. The adjacency is established through the use of the conventional ISIS Hello protocol by exchanging ISIS Hello packets between the routers. To that end, the ISIS protocol engine 350 of Rtr A 200*a* creates an ISIS Hello message that is encapsulated by CLNP encapsulation transmission stack 325 into a CLNP-encapsulated, multicast ISIS Hello packet for transmission over its unidirectional link interface 320 to Rtr B. Specifically, the ISIS protocol engine 350 of Rtr A generates a process message data structure (e.g., the ISIS Hello message) that is passed to the CLNP encapsulation transmission stack 325, which transforms the message into an ISIS Hello packet by, inter alia, encapsulating a conventional CLNP header onto the message.

Because it is connected to the receive-only side of unidirectional link 102, Rtr B cannot transmit a similar ISIS Hello packet over the link to Rtr A in response to receipt of the packet. Thus, according to an aspect of the invention, Rtr B returns an ISIS Hello packet over an alternate, multi-hop path 110 to neighbor Rtr A. The multi-hop path 110 comprises a plurality of bidirectional links 104 adapted to transfer IP-encapsulated packets between the routers. However, the conventional CLNP-encapsulated ISIS packet does not contain IP addresses (and, in particular, a source IP address of the sending router, Rtr A) needed for the ISIS Hello packet to traverse the multi-hop path 110 to neighbor Rtr A.

Figure 4:
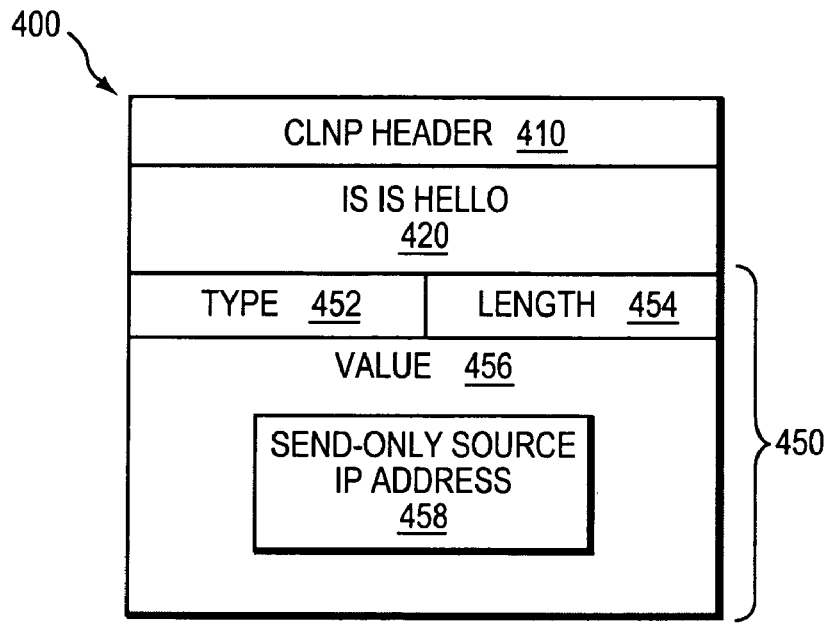
FIG. 4 is a schematic block diagram of a CLNP-encapsulated, multicast Intermediate-System-to-Intermediate-System (ISIS) Hello packet with an appended type/length/value (TLV) encoded format that may be advantageously used with the present invention.

According to another aspect of the invention, the ISIS protocol engine 350 of Rtr A 200*a* modifies the ISIS Hello packet through the introduction of a new type/length/value (TLV) encoded format configured to convey information to the receive-only router, Rtr B. FIG. 4 is a schematic block diagram of a CLNP-encapsulated, multicast ISIS Hello packet 400 with an appended TLV encoded format 450 that may be advantageously used with the present invention. The packet 400 comprises a conventional CLNP header 410 prepended to a conventional ISIS Hello message 420. In addition, the TLV 450 contains an IP address that the receive-only router Rtr B uses when sending its IP-encapsulated multi-hop ISIS Hello packets to Rtr A. That is, the scope of TLV 450 is to enable a send-only router Rtr A to encode a source IP address to its neighbor, i.e., a receive-only router Rtr B, to thereby enable Rtr B to use that source address as a "destination" IP address when encapsulating IP Hello packets to send back to the send-only router.

Essentially, this aspect of the invention involves an extension to the ISIS protocol that provides a TLV 450 for an ISIS packet. The TLV encoding format is a general way to communicate information between nodes, such as routers. The TLV 450 is used to identify a type (T) of information being communicated (conveyed), a length (L) of information to be conveyed and a value (V) of the actual information conveyed. The length (L) parameter contained in the length field 454 is typically implementation-specific and can denote the length from the beginning of the Type field 452 of the attribute 450 to the end. However, the length generally denotes the length of the Value (V) field 456 and not the Type (T) or Length (L) fields. Illustratively, a predetermined type (T) may be defined for the TLV 450 having a value (V) of a send-only source IP address 458.

In response to receipt of the CLNP-encapsulated ISIS Hello packet 400, the CLNP encapsulation transmission stack 325 of the receive-only router, Rtr B, deencapsulates the CLNP header 410 from the packet and passes the ISIS Hello message 420 with appended TLV 450 to the ISIS protocol engine 350 on Rtr B for processing. The receive-only router then proceeds with establishment of an adjacency over the unidirectional link 102. According to the invention, the receive-only router is configured to locate the appended TLV 450 and extract the send-only source IP address 458, which specifies the IP address to use when responding to the packet 400 in order to establish the adjacency. In particular, ISIS protocol engine 350 on the receive-only router is configured to extract the send-only source IP address 458 from the TLV 450.

Figure 5:
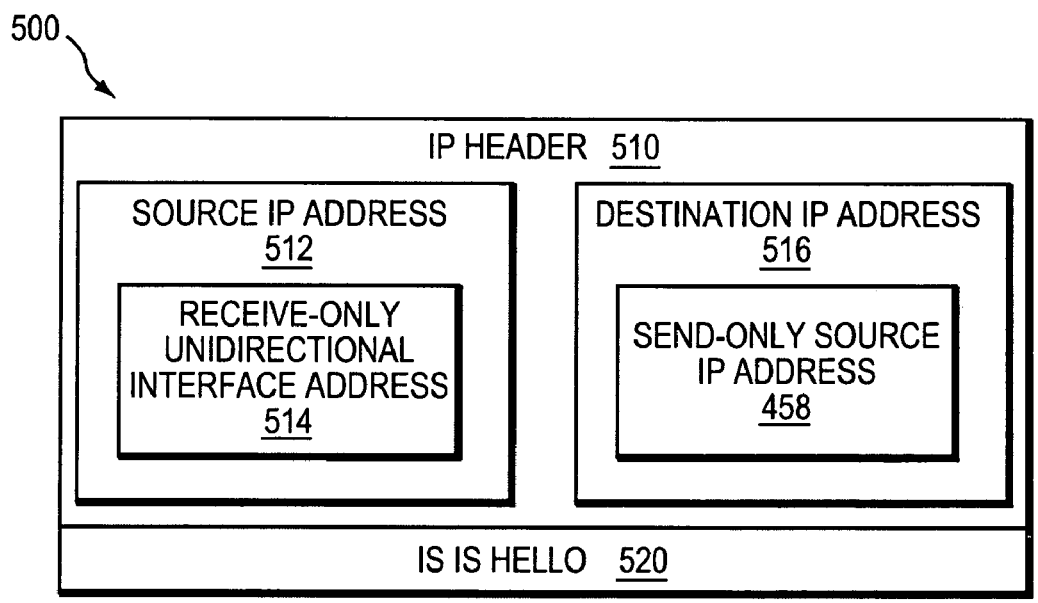
FIG. 5 is a schematic block diagram of an IP-encapsulated, unicast ISIS Hello packet that may be advantageously used with the present invention.

The ISIS protocol engine 350 then cooperates with the IP encapsulation transmission stack 335 of Rtr B to create an IP-encapsulated unicast ISIS Hello packet for transmission to Rtr A. More specifically, the ISIS protocol engine 350 of Rtr B generates a process message data structure (e.g., the ISIS Hello message) that is passed to the IP encapsulation transmission stack 335, which transforms the message into an ISIS Hello packet by, inter alia, encapsulating a conventional IP header onto message. FIG. 5 is a schematic block diagram of an IP-encapsulated, unicast ISIS Hello packet 500 that may be advantageously used with the present invention. The packet 500 comprises a conventional IP header 510 prepended to a conventional ISIS Hello message 520. Notably, the IP header 510 includes a source IP address 512 equal to receive-only unidirectional interface address 514 (e.g., of Rtr B) and a destination IP address 516 equal to send-only source IP address 458 (e.g., of Rtr A) extracted from TLV 450. The IP-encapsulated unicast ISIS Hello packet 500 is then transmitted over the bidirectional link interface 330 of Rtr B and onto the multi-hop path 110 of network 100. For example, the multi-hop unicast Hello packet traverses a return path encompassing Rtr D and Rtr C, where it is received by Rtr A.

According to yet another aspect of the invention, the send-only router, Rtr A, correlates the received IP-encapsulated multi-hop unicast Hello packet 500 with unidirectional link 102. That is, notwithstanding the multi-hop path 110 traversed by the Hello packet 500, Rtr A is configured to determine that the packet belongs to an adjacency being established between Rtr A and Rtr B by, e.g., examining the source and destination IP addresses contained in the packet 500. As noted, the Hello packet 500 is encapsulated with a source IP address 512 that belongs to the unidirectional link subnet, e.g., 192.168.10/24, and a destination IP address 516 that was previously advertised by the receive-only router, Rtr B. Accordingly, Rtr A determines that the source IP address 512 belongs to directly connected unidirectional link 102 which, in turn, belongs to the unidirectional link subnet and that the destination IP address 516 is the send-only source IP address 458 it previously advertised to its neighbor (via TLV 450). In essence, this aspect of the invention extends the functionality of the ISIS protocol engine 350 on the send-only router to recognize and act upon this information.

In alternate embodiments, the user (administrator) that configures the send-only router may be given the option to choose an address to advertise during adjacency establishment. Assume the send-only router has interfaces to a plurality of (many) unidirectional links within the same subnet. Over each unidirectional link, the administrator may choose to advertise an ISIS Hello packet with the new TLV encoded to a different source IP address for use by a neighbor (the receive-only router) when returning a unicast Hello packet. This is particularly advantageous in that it allows the administrator to discriminate among the different returned Hello packets, e.g., understand from which neighbor a packet was returned.

Upon correlating the received Hello packet 500 with unidirectional link 102 and, more specifically, neighbor Rtr B, Rtr A and Rtr B establish an adjacency. Since the routing protocol is ISIS, conventional ISIS adjacency state machinery is used to establish the ISIS adjacency. Thus, the ISIS protocol engines 350 of the send-only and receive-only routers coupled to unidirectional link 102 may establish an adjacency over that unidirectional link even if their Hello packets 400 and 500 did not traverse exactly the same paths.

Figure 6:
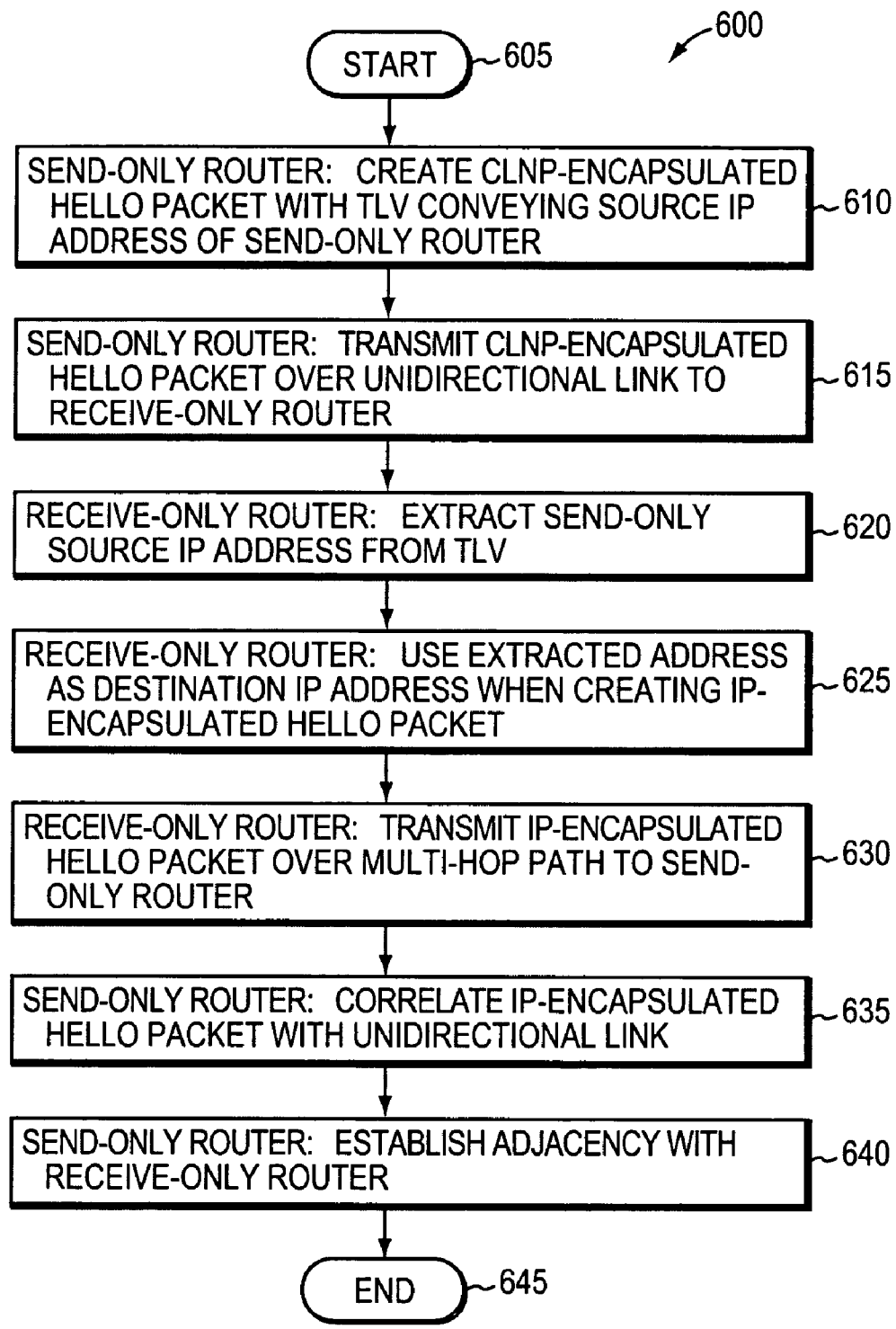
FIG. 6 is a flowchart illustrating a procedure for establishing an adjacency over a unidirectional link of a computer network that is configured to implement the ISIS routing protocol in accordance with the present invention.

FIG. 6 is a flowchart illustrating a procedure 600 for establishing an adjacency over a unidirectional link of a computer network that is configured to implement a routing protocol, such as the ISIS routing protocol, in accordance with the present invention. The procedure starts at Step 605 and proceeds to Step 610 where send-only router, Rtr A, creates a CLNP-encapsulated, multicast ISIS Hello packet with a TLV configured to convey a send-only source IP address for use by receive-only router, Rtr B. In Step 615, the send-only router transmits the CLNP-encapsulated Hello packet over the unidirectional link to the receive-only router. In Step 620, the receive-only router extracts the send-only source IP address from the TLV of the packet and, in Step 625, uses that address as destination IP address when creating an IP-encapsulated unicast ISIS Hello packet. In Step 630, the receive-only router transmits the IP-encapsulated Hello packet over a multi-hop path of the network to the send-only router. In Step 635, the send-only router correlates the IP-encapsulated Hello packet with the unidirectional link and, in Step 640, establishes an adjacency with the receive-only router over the unidirectional link. The procedure then ends at Step 645.

Forwarding MAC Addresses

Once the adjacency is established, the send-only router is generally ready to forward data packets over the unidirectional link 102. Data forwarding, in this context, denotes forwarding of actual data packets and not ISIS routing protocol packets. In the case of point-to-point links, cables or fibers, media access control (MAC) addresses are not typically needed because the data packets are merely forwarded over one end of the link (wire) and are received by the router at the other end of the wire. However, in the case of a satellite link, the identity of the receiver is needed, particularly for unicast transmission of data packets to the receiver.

Thus, in order to forward such data traffic, the send-only router needs to know the MAC address of each of its neighbors. Moreover, since data forwarding occurs in only one direction over the unidirectional link, this aspect of the invention concerns only the send-only router forwarding data to the receive-only router. In the case of unidirectional links, the conventional address resolution protocol (ARP) does not work; accordingly, another aspect of the present invention contemplates use the IP-encapsulated, unicast ISIS Hello packet described above to propagate MAC addresses from the receive-only router to the send-only router.

Figure 7:
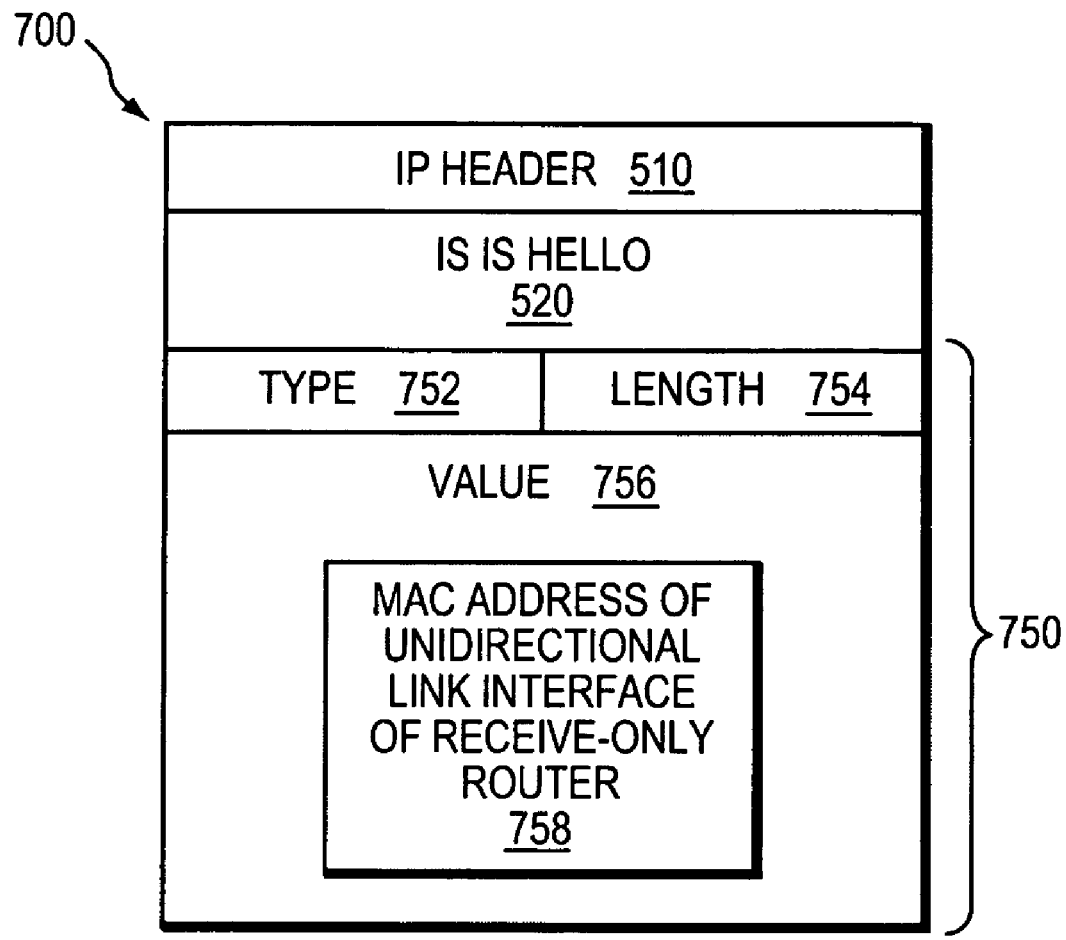
FIG. 7 is a schematic block diagram of an embodiment of IP-encapsulated, unicast ISIS Hello packet with an appended TLV encoded format that may be advantageously used with the present invention.

FIG. 7 is a schematic block diagram of an embodiment of IP-encapsulated, unicast ISIS Hello packet 700 with an appended TLV encoded format that may be advantageously used with the present invention. The packet 700 comprises the IP header 510 and ISIS Hello message 520 of the IP-encapsulated unicast Hello packet 500 (FIG. 5) with a TLV 750 that is appended by the receive-only router, Rtr B, prior to returning the packet to the send-only router, Rtr A. Notably, the TLV 750 conveys the identity of the receive-only router to the send-only router. To that end, the TLV 750 contains the MAC address that the send-only router uses when forwarding (routing) traffic over the unidirectional link 102 to the receive-only router. According to the invention, a predetermined type (stored in type field 752) may be defined for the TLV 750 with a length (stored in length field 754) determined by the length of value field 756, which is encoded with the MAC address of the unidirectional link interface on the receive-only router 758. The IP-encapsulated unicast ISIS Hello packet 700 is thereafter transmitted over the bidirectional link interface 330 of Rtr B and onto the multi-hop path 110 of network 100, as described above.

Shortest Path First (SPF) Algorithm Computation.

Once the adjacency is established and the MAC address to use is known, the receive-only router is ready to compute the multi-hop path to the send-only router. Here, it is important that the receive-only router never consider sending a packet into the unidirectional link (because that router is on the wrong side of the link). Thus, the receive (RX)->transmit (TX) direction of the unidirectional link 102 should never be incorporated in any router topology and the router is instructed that the RX->TX direction of the unidirectional link (from receiver to sender) should never be used. Illustratively, this instruction is manifested as an infinite metric definition in RFC 3784 entitled *Intermediate-System-to-Intermediate-System (IS-IS) Extensions for Traffic Engineering (TE)* dated June 2004, which is hereby incorporated by reference in its entirety.

Specifically, the RX->TX direction of the unidirectional link is not part of any Shortest Path Tree in any router if configured with maximum_link_metric, as specified in RFC 3784. That is, the concept of an infinite metric (max metric) as defined in ISIS states that, if advertised with the maximum link metric ($2^{24}-1$), a link must not be considered during normal SPF computation. Thus, configuring a link with a metric that is infinite, e.g., all 24 bits of the metric set to 1, ensures that every ISIS router in the domain/area that computes SPF will never use that link. In other words, the RX->TX direction of a particular unidirectional link (or route) is advertised throughout the domain/area with an infinite metric. Thereafter when an SPF computation is performed on the contents of an ISIS routing table, the link (or route) having an infinite metric is not considered in the computation.

Next-Hop Calculation

Next-hop calculation does not differ from the calculation used in conventional bidirectional links. The receive-only router never uses the unidirectional link interface as a next-hop interface so there is no specific next-hop calculation. The next-hop calculation performed by the send-only router takes into consideration that the receive-only router/neighbor is reachable through the unidirectional link and with a MAC address advertised within the Hello packets originated by the receive-only router. The send-only router thus has all the information needed to correctly populate the next-hop attributes of any route whose next-hop is the receive-only router.

While there has been shown and described an embodiment of a system and method for routing traffic over unidirectional links of a computer network that is configured to implement a routing protocol, such as the ISIS routing protocol, it is to be understood that various other adaptations and modifications may be made within the spirit and scope of the present invention. For example, it should be noted that the novel TLVs 450 and 750 (used for adjacency establishment and data forwarding, respectively) do not need to be included on every ISIS Hello packet (sent by the send-only router and the receive-only router, respectively) since all that is required is that the information be communicated once. However, in the illustrative embodiment, the new TLVs 450 and 750 are included on every Hello packet transmission. This obviates additional processing and complexity that would be required when advertising this information only once; in other words, this obviates the need to ensure that information was received (i) initially, (ii) in response to a configuration change, and (iii) if removed. It is thus more efficient to send the TLV each time the Hello packet is sent.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various modules and stacks described herein, can be implemented as software, including a computer-readable medium having program instructions executing on a computer, hardware, firmware, or a combination thereof. In addition, it is understood that the data structures, such as packets and TLVs, described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for routing traffic over a unidirectional link of a computer network configured to implement a routing protocol, the method comprising the steps of:

dynamically discovering neighboring routers connected to the unidirectional link using the routing protocol in order to establish an adjacency between the routers over the link, the neighboring routers including a receive-only router connected to a receive-only side of the unidirectional link and a send-only router connected to a send-only side of the link; and routing the traffic over the unidirectional link of the network, wherein the routing protocol comprises the Intermediate System-to-Intermediate System (ISIS) routing protocol.

2. The method of claim 1 further comprising the step of computing a multi-hop path from the receive-only router to the send-only router.

3. The method of claim 2 wherein the step of computing comprises the step of computing routes across the network taking into account the unidirectional link.

4. The method of claim 1 wherein the step of dynamically discovering comprises the step of extending the ISIS routing protocol through the use of type/length/value (TLV) encoded formats appended to ISIS Hello packets to convey information between the neighboring routers.

5. The method of claim 4 wherein the step of extending comprises the steps of:

appending, at the send-only router, a TLV to a Connectionless Network Protocol (CLNP)-encapsulated, multicast ISIS Hello packet, the appended TLV encoded to contain a send-only Internet Protocol (IP) address of the send-only router; and transmitting the CLNP-encapsulated, multicast ISIS Hello packet with the appended TLV to the receive-only router.

6. The method of claim 5 further comprising the steps of:

locating the appended TLV at the receive-only router;

extracting the send-only IP address from the appended TLV;

creating an IP-encapsulated multi-hop unicast ISIS Hello packet containing the extracted send-only IP address as a destination IP address and a unidirectional interface address of the receive-only router as a source IP address; and transmitting the IP-encapsulated multi-hop unicast ISIS Hello packet over a multi-hop path of the network to the send-only router.

7. The method of claim 6 further comprising the step of correlating, at the send-only router, the IP-encapsulated multi-hop unicast Hello packet with the unidirectional link.

8. The method of claim 7 wherein the step of correlating comprises the step of determining, at the send-only router, that the source IP address belongs to a unidirectional link subnet directly connected to the send-only router and that the destination IP address is the send-only IP address previously advertised to the receive-only router.

9. The method of claim 4 wherein the step of extending comprises the steps of:

appending, at the receive-only router, a TLV to an Internet Protocol (IP)-encapsulated, multi-hop unicast ISIS Hello packet, the appended TLV encoded to convey an identity of the receive-only router to the send-only router; and transmitting the IP-encapsulated, multi-hop unicast ISIS Hello packet with the appended TLV to the send-only router.

10. The method of claim 9 wherein the identity of the receive-only router is a media access control (MAC) address of a unidirectional link interface on the receive-only router and wherein the step of routing comprises the step of using, at the send-only router, the MAC address when routing traffic over the unidirectional link to the receive-only router.

11. A network node configured to route traffic over a unidirectional link of a computer network configured to implement a routing protocol, the network node comprising:

a routing protocol engine configured to dynamically discover a neighboring network node connected to the unidirectional link, the routing protocol engine further configured to establish an adjacency with the neighboring network node over the unidirectional link; and an encapsulation transmission stack cooperating with the routing protocol engine to route the traffic over the unidirectional link to the neighboring network node of the network, wherein the routing protocol comprises the Intermediate System-to-Intermediate System (ISIS) routing protocol and wherein the routing protocol engine is an ISIS protocol engine.

12. The network node of claim 11 wherein the encapsulation transmission stack is one of a Connectionless Network Protocol (CLNP) encapsulation transmission stack and an Internet Protocol (IP) encapsulation transmission stack.

13. The network node of claim 12 wherein the ISIS protocol engine further cooperates with the encapsulation transmission stack to append a type/length/value (TLV) encoded format to one of a CLNP-encapsulated and IP-encapsulated ISIS Hello packet to thereby convey information between the network nodes.

14. The network node of claim 11 wherein the neighboring network node is a receive-only router connected to a receive-only side of the unidirectional link and wherein the network node is a send-only router connected to a send-only side of the unidirectional link.

15. An apparatus configured to route traffic over a unidirectional link of a computer network configured to implement a routing protocol, the apparatus comprising:

means for dynamically discovering neighboring routers connected to the unidirectional link in order to establish an adjacency between the routers over the link, the neighboring routers including a receive-only router connected to a receive-only side of the unidirectional link and a send-only router connected to a send-only side of the link; and means for routing the traffic over the unidirectional link of the network, wherein the routing protocol comprises the Intermediate System-to-Intermediate System (ISIS) routing protocol.

* * * * *